(12) United States Patent  
Miller

(10) Patent No.: US 8,306,739 B2
(45) Date of Patent: Nov. 6, 2012

(54) SYSTEM AND METHOD FOR TRACKING A VEHICLE BASED ON DRIVER STATUS

(75) Inventor: Thomas Lee Miller, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 678 days.

(21) Appl. No.: 12/492,846

(22) Filed: Jun. 26, 2009

(65) Prior Publication Data

US 2009/0326813 A1  Dec. 31, 2009

Related U.S. Application Data

(60) Provisional application No. 61/076,329, filed on Jun. 27, 2008.

(51) Int. Cl.
*G01C 21/00* (2006.01)
(52) U.S. Cl. ........................................ 701/412
(58) Field of Classification Search ............... 701/2, 400, 701/408, 409, 412, 418, 425, 430, 451, 461
See application file for complete search history.

(56) References Cited

U.S. PATENT DOCUMENTS

| | | | |
|---|---|---|---|
| 5,769,051 A | 6/1998 | Bayron et al. |
| 5,803,043 A | 9/1998 | Bayron et al. |
| 5,829,782 A | 11/1998 | Breed et al. |
| 6,515,596 B2 | 2/2003 | Awada |
| 6,675,082 B2 | 1/2004 | Galli et al. |
| 6,701,234 B1 | 3/2004 | Vogelsang |
| 6,772,061 B1 | 8/2004 | Berthiaume et al. |
| 6,785,595 B2 | 8/2004 | Kominami et al. |
| 6,897,767 B2 | 5/2005 | Kim |
| 6,952,156 B2 | 10/2005 | Arshad et al. |
| 6,998,956 B2 | 2/2006 | Dix |
| 7,006,914 B1 | 2/2006 | Cahoon |
| 7,075,409 B2 | 7/2006 | Guba |
| 7,356,392 B2 | 4/2008 | Hubbard et al. |

(Continued)

FOREIGN PATENT DOCUMENTS

DE  19961619 A1  6/2001

(Continued)

OTHER PUBLICATIONS

ZR-1 Introduction; http://www.zr1netregistry.com/ZR1_about.htm, dated Sep. 25, 2006, 4 pages.

(Continued)

*Primary Examiner* — Kim T Nguyen
(74) *Attorney, Agent, or Firm* — Brooks Kushman P.C.; Jennifer M. Stec

(57) ABSTRACT

In at least one embodiment a system and a method for tracking locations for one of a primary driver and a secondary driver is provided. The apparatus comprises a communication module configured to receive a driver status signal indicative of the driver being the secondary driver. The communication module is further configured to detect the presence of a memory map device that provides map data for one or more locations capable of being visited by the secondary driver and to receive a location signal having coordinate data that corresponds to one or more locations visited by the secondary driver. The communication module is further configured to store the coordinate data when the memory map device is not detected so that the coordinate data is available for transmission with the map data when the memory map device is detected.

12 Claims, 3 Drawing Sheets

U.S. PATENT DOCUMENTS

| | | |
|---|---|---|
| 7,463,896 B2 | 12/2008 | Himmelstein |
| 7,757,803 B2 | 7/2010 | Fiske et al. |
| 7,959,177 B2 | 6/2011 | Fiske et al. |
| 2004/0263316 A1 | 12/2004 | Dix et al. |
| 2006/0271265 A1 | 11/2006 | Kawazoe et al. |
| 2007/0067086 A1 | 3/2007 | Rothschild |
| 2007/0126604 A1 | 6/2007 | Thacher |
| 2007/0265744 A1* | 11/2007 | Nicolai ............................ 701/35 |
| 2008/0030316 A1 | 2/2008 | Flick |
| 2008/0275604 A1 | 11/2008 | Perry et al. |

FOREIGN PATENT DOCUMENTS

| | | |
|---|---|---|
| DE | 102005007865 A1 | 9/2006 |
| EP | 1101670 A2 | 5/2001 |
| GB | 2273580 A | 6/1994 |
| WO | 0125572 A1 | 4/2001 |

OTHER PUBLICATIONS

Road Safety RS-1000 Automotive On-Board Computer for Teen Drivers; http://www.techedu.com/RoadSafety_RS-1000.asp, dated Sep. 27, 2006, 5 pages.

European Search Report for Application No. 09770872.1, mailed Jun. 7, 2011, 6 pages.

Patty Mattern, "Getting smarter at getting safer", University of Minnesota, UMNnews, Sep. 13, 2005, 2 pages.

* cited by examiner

SYSTEM AND METHOD FOR TRACKING A VEHICLE BASED ON DRIVER STATUS

CROSS-REFERENCE TO RELATED APPLICATIONS

This application claims the benefit of U.S. provisional application Ser. No. 61/076,329 filed on Jun. 27, 2008 which is hereby incorporated by reference in its entirety.

BACKGROUND

1. Technical Field

The embodiments of the present invention generally relate to a system and method for tracking a vehicle based on driver status.

2. Background Art

With conventional automotive vehicles, one or more keys are often shared between any number of drivers (e.g., parent/teen, employer/employee, owner/valet driver, or fleet vehicle owner/fleet vehicle driver). In one example, the parents of a teenager (or young adult) that is old enough to drive may provide the keys of the vehicle with the teenager. The vehicle may be equipped with various safety and/or driver notification features that may be enabled/disabled via a user interface based on the driver's needs. However, in some circumstances, the parent may not intend to have the various safety and notification related features disabled by the teenager. The parent may enable the safety and notification features prior to allowing the teenager to drive the vehicle, however there is no guarantee that the teenager may keep the safety and notification features enabled while driving the vehicle. Conventional vehicles fail to give parents, or other primary drivers, the option of preventing teenagers that are eligible to drive or other such secondary drivers from disabling safety and notification features.

In most cases, the parent, employer, owner of vehicle, or fleet owner may not be fully aware of the manner as to where the teen, employee, valet service provider, or fleet vehicle driver has driven the vehicle. In most cases, the primary driver has to assume that the secondary driver has driven the vehicle to the location specified by the secondary driver. Primary drivers may want to know where a teen, employee or valet driver has driven the vehicle when the primary driver is not in the vehicle.

SUMMARY

In at least one embodiment a system and a method for tracking locations for one of a primary driver and a secondary driver is provided. The apparatus comprises a communication module configured to receive a driver status signal indicative of the driver being the secondary driver. The communication module is further configured to detect the presence of a memory map device that provides map data for one or more locations capable of being visited by the secondary driver and to receive a location signal having coordinate data that corresponds to one or more locations visited by the secondary driver. The communication module is further configured to store the coordinate data when the memory map device is not detected so that the coordinate data is available for transmission with the map data when the memory map device is detected.

DETAILED DESCRIPTION

The embodiments of the present invention generally provide for a driver identification functional operation whereby primary and secondary drivers are determined and various levels of control are granted to the driver based on whether the driver is the primary driver or the secondary driver. In general, the primary driver (e.g., a parent, employer, consumer of valet services, fleet vehicle owner) may be defined as the administrative driver who has greater control over the functionality of the various features (e.g., safety features and/or safety notification features) in the vehicle. For example, the primary driver may enable or disable the various features in the vehicle. The secondary driver may be defined as a restricted driver who has limited control over features generally provided by the vehicle and is to abide by the functional restrictions imposed or selected by the vehicle or the primary driver. For example, the primary driver may enable the features for the secondary driver, and the secondary driver is not capable of disabling such features when enabled by the primary driver.

The embodiments of the present invention generally provide, among other things, for a system and method for tracking a vehicle based on driver status. For example, electrical device(s) in the vehicle may determine driver status (e.g., whether the driver is the primary driver or the secondary driver) and record locations for each vehicle trip taken by the secondary driver. The recorded locations can be viewed via a display in the vehicle, saved to a portable memory device, or uploaded to a server for retrieval by the primary driver and/or the secondary driver.

Figure 1:
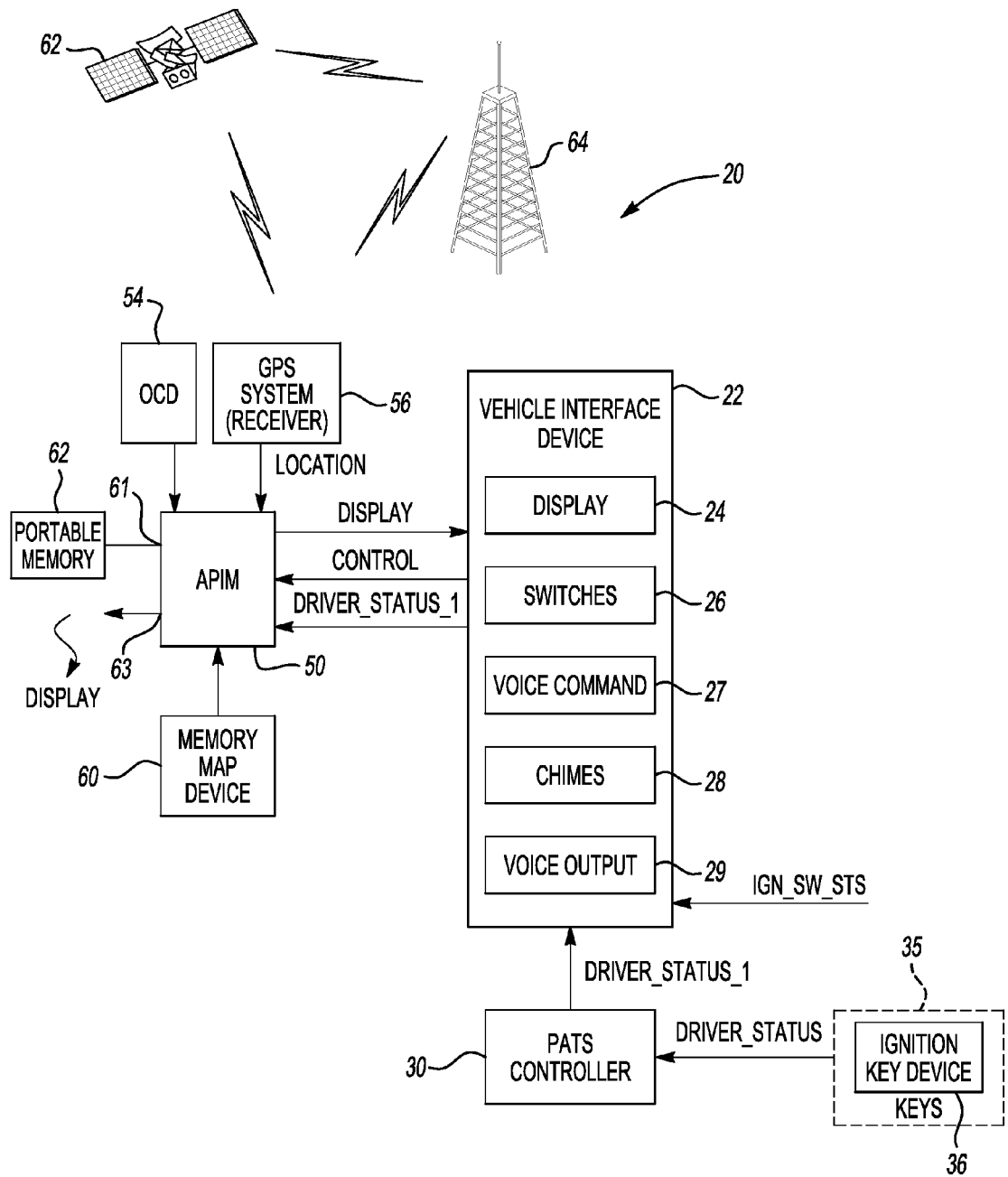
FIG. 1 depicts a system for differentiating between primary and secondary drivers of a vehicle and for tracking the location of the vehicle based on the status of the driver in accordance to one embodiment of the present invention.
Figure 2:
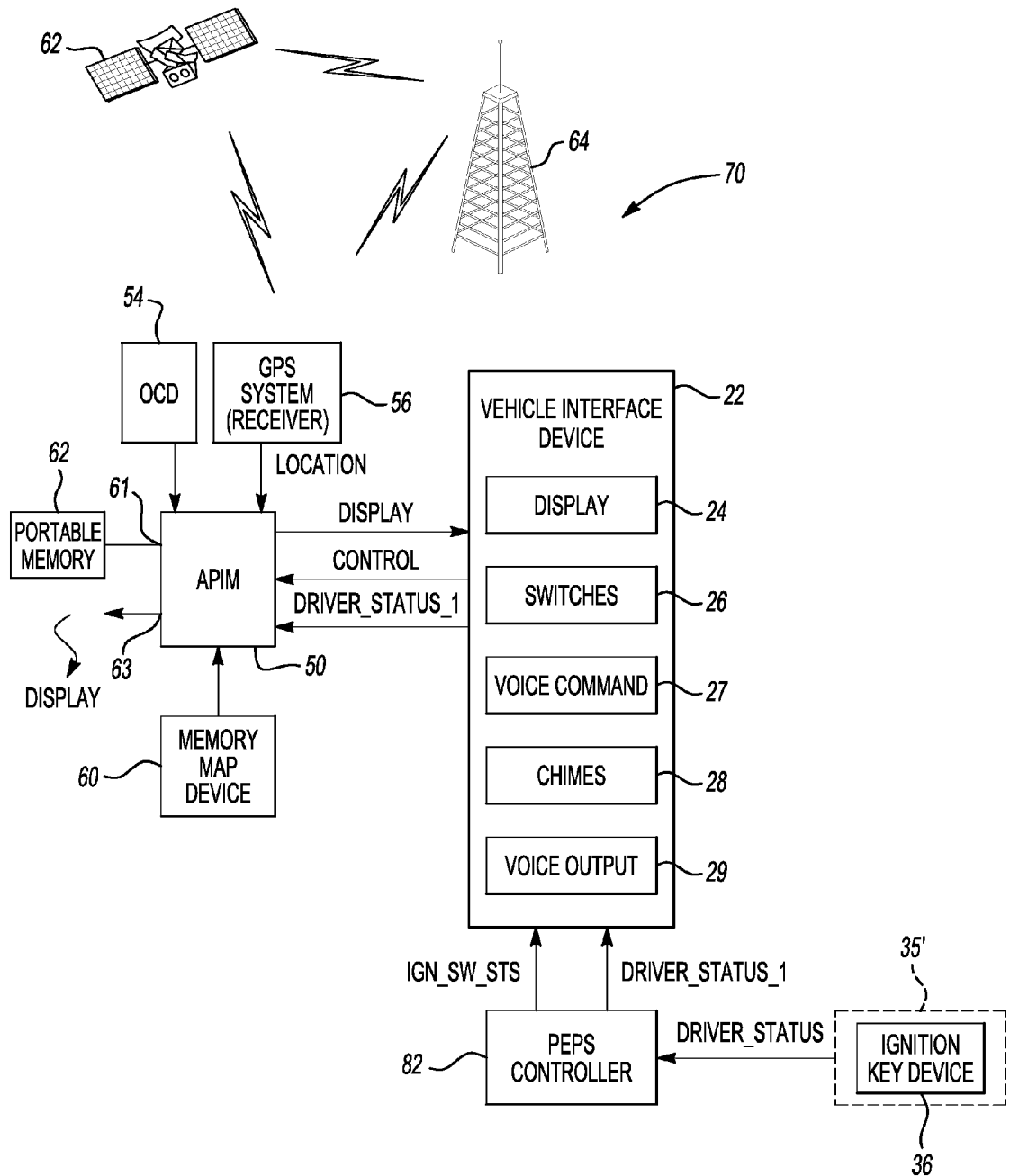
FIG. 2 depicts another system for differentiating between primary and secondary drivers of a vehicle and for tracking the location of the vehicle based on the status of the driver in accordance to one embodiment of the present invention.
Figure 3:
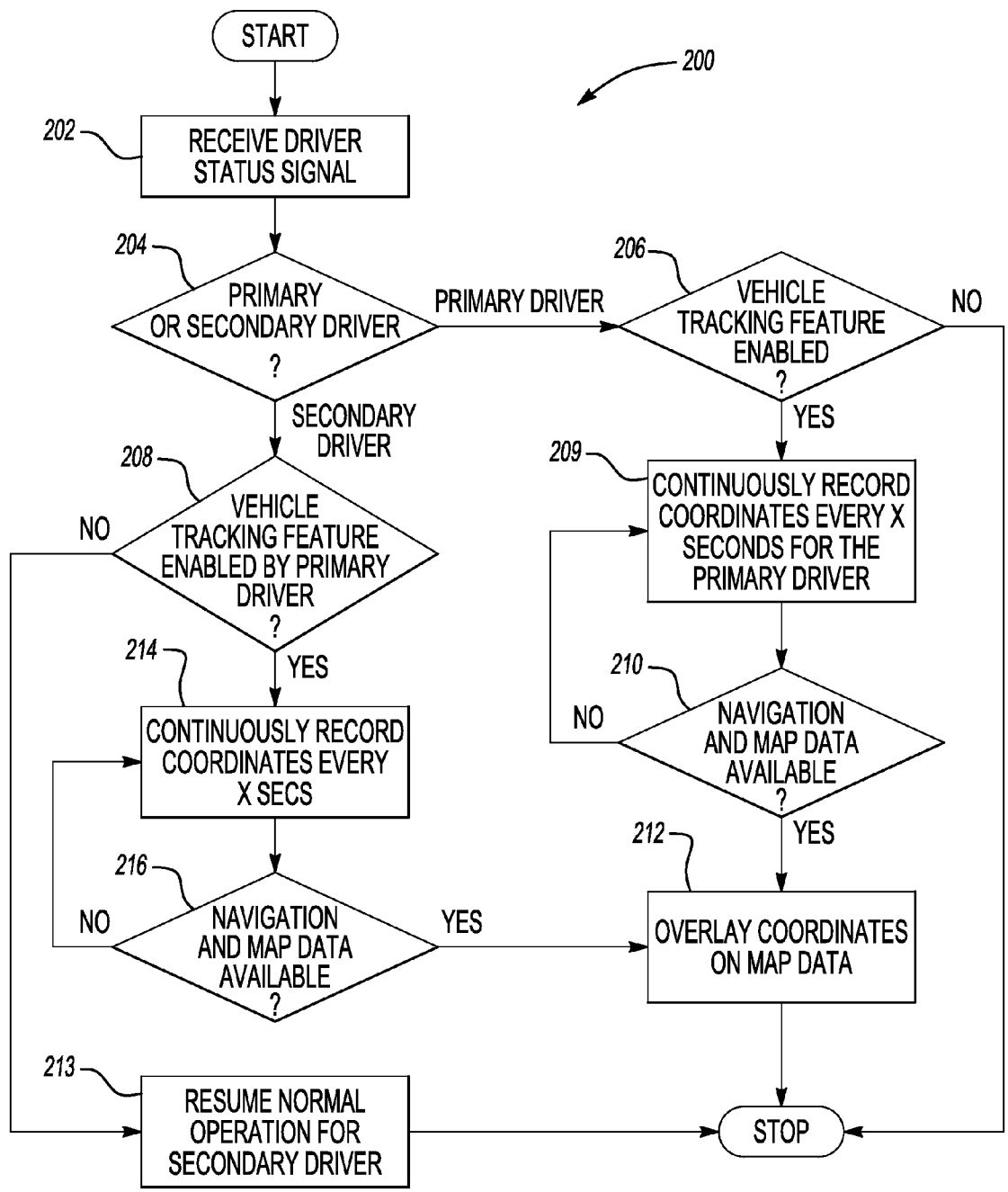
FIG. 3 depicts a method for tracking the location of the vehicle based on the status of the driver in accordance to one embodiment of the present invention.

The embodiments of the present invention as set forth in FIGS. 1-3 generally illustrate and describe a plurality of controllers (or modules/devices), or other electrically based components. All references to the various controllers and electrically based components and the functionality provided for each, are not intended to be limited to encompassing only what is illustrated and described herein. While particular labels may be assigned to the various controllers and/or electrical components disclosed, such labels are not intended to limit the scope of operation for the controllers and/or the electrical components. The controllers may be combined with each other and/or separated in any manner based on the particular type of electrical architecture that is desired in the vehicle. It is generally recognized that each controller and/or module/device disclosed herein may include, but not limited to, any number of microprocessors, ASICs, ICs, memory devices (e.g., FLASH, RAM, ROM, EPROM, EEPROM, or other suitable variants thereof), firmware, and software which co-act with one another to perform the various functions set forth below.

FIG. 1 depicts a system 20 for differentiating between primary and secondary drivers of a vehicle and for tracking the location of the vehicle based on the status of the driver in accordance to one embodiment of the present invention. The system 20 generally comprises a vehicle interface device 22. The device 22 includes a display 24 that provides information related to the various states of vehicle functionality to the driver. For example, the display 24 may provide, but not limited to, a driver identification message during vehicle startup, various administrative menu options, a seatbelt warning message, a speed limit start up message, vehicle near top speed message, top speed message, driver identification speed warnings, and/or an inhibit ESC and FCW message. The display 24 may also provide a map that includes identified locations of places visited by the secondary driver with the vehicle.

The device 22 also includes a plurality of switches 26, a voice recognition command interface 27, chimes 28, and voice output capability 29. The driver may toggle the switches 26 to view different messages and/or respond to various prompts directed to the driver by the vehicle. The voice recognition command interface 27 may enable the vehicle to receive commands from the driver so that the driver may audibly input commands and/or responses. One example of a voice recognition command interface is disclosed in U.S. Patent Publication No. 20040143440 ("the '440 publication"), entitled "Vehicle Speech Recognition System", filed Dec. 31, 2003.

The chimes 28 may audibly notify the driver when predetermined vehicle conditions have been met. In one example, the device 22 may activate the chimes 28 when the vehicle is near a top speed, the vehicle has achieved a top speed, the vehicle has exceeded the top speed, there is a low level of fuel in the fuel tank, and/or when the traction control is enabled. In one example, the voice output capability 29 enables the device 22 to transmit audio signals to the driver in the manner, but not limited to, that described in the '440 publication. While the display 24, the switches 26, the voice input command interface 27, chimes 28, and the voice output capability 29 are shown within the device 22, it is contemplated that one or more of these mechanisms may be positioned exterior to the device 22.

A passive anti-theft security (PATS) controller 30 is operably coupled to the device 22. While FIG. 1 generally illustrates that the PATS controller 30 is positioned outside of the device 22, other implementations may include the PATS controller 30 being implemented directly within the device 22. In general, one or more of the signals transmitted to/from the device 22 may be transmitted via a data communication bus. The bus may be implemented as a High/Medium Speed Controller Area Network (CAN) bus, a Local Interconnect Network (LIN) bus or other suitable bus generally situated to facilitate data transfer therethrough. The particular type of bus used may be varied to meet the desired criteria of a particular implementation.

An ignition switch (not shown) may receive one or more keys 35. The device 22 may receive a signal IGN_SW_STS from a body controller (not shown) to determine the position of the ignition switch. The keys 35 may be tagged or associated with the primary driver or the secondary driver of the vehicle. The key 35 includes an ignition key device 36 embedded therein for communicating with the vehicle. The ignition key device 36 may be in the form of a transponder (not shown) that includes an integrated circuit and an antenna. The transponder is adapted to transmit an electronic code as a signal DRIVER_STATUS to a receiver (not shown) in the PATS controller 30. The signal DRIVER_STATUS may be indicative of which driver (e.g., primary or secondary) is driving the vehicle. The signal DRIVER_STATUS may be in the form of radio frequency (RF) based signal or a radio frequency identification (RFID) tag that corresponds to binary data. The PATS controller 30 determines if the RF based data in the signal DRIVER_STATUS matches predetermined data stored therein (e.g., in a look up table of the PATS controller 30) prior to allowing the vehicle to start for anti-theft purposes. In the event the RF based data matches the predetermined data, a powertrain control module (or engine controller) (not shown) operably coupled to the PATS controller 30 enables the engine to start. In general, the vehicle assembly plant, supplier facility (e.g., manufacturer of the keys and/or PATS controller 30), car dealership, or vehicle owner performs the operation of learning the data transmitted by the keys 35. The PATS controller 30 may also use the data on the signal DRIVER_STATUS for purposes of identifying whether the driver of the vehicle is the primary driver or the secondary driver.

The PATS controller 30 may transmit a signal DRIVER_STATUS_1 to indicate whether the driver is the primary driver or the secondary driver. Prior to the PATS controller 30 transmitting the signal DRIVER_STATUS_1, the keys 35 need to be programmed as a primary key or as a secondary key. The manner in which the keys 35 are designated as either a primary key or a secondary key is set forth in one or more of the following U.S. patent Ser. Nos. 12/139,005, entitled "SYSTEM AND METHOD FOR PROGRAMMING KEYS TO VEHICLE TO ESTABLISH PRIMARY AND SECONDARY DRIVERS" and filed on Jun. 13, 2008; 12/433,642, entitled "SYSTEM AND METHOD FOR ASSIGNING DRIVER STATUS TO A SPARE KEY AND FOR PROGRAMMING THE SPARE KEY TO A VEHICLE" and filed on Apr. 30, 2009; and 12/992,397, entitled "SYSTEM AND METHOD FOR CONTROLLING AN ENTERTAINMENT DEVICE IN A VEHICLE BASED ON DRIVER STATUS AND A PREDETERMINED VEHICLE EVENT" and filed on Nov. 12, 2010, all of which are hereby incorporated by reference in their entirety.

An auxiliary protocol interface module (APIM) (or communication module) 50 is operably coupled to the device 22. The APIM 50 is configured to receive an occupant communication device (OCD) 54. The APIM 50 is generally part of an in vehicle communication system which interfaces with the OCD 54 to enable voice input control to perform a function with the OCD 54 so that the driver does not have to enter data directly into the OCD 54. The APIM 50 may interface via switches (not shown) positioned within the vehicle to enable touch selection control to perform a function with the OCD 54 so that the driver does not have to enter data directly into the OCD 54. The OCD 54 is wirelessly coupled to the APIM 50. In one example, the APIM 50 may be implemented as part of the SYNC system developed by Ford Motor Company® and Microsoft® which is known in the art. The OCD 54 may include any number of communication devices that use a wireless protocol. For example, one such wireless protocol may include Bluetooth™. The OCD 54 may use any protocol that is generally situated to facilitate wireless communication. The OCD 54 may be a phone, a text messaging device, a music generating device (such as a phone that plays MP3 songs) whereby all of such items use the Bluetooth™ protocol to communicate. In yet another example, the OCD 54 may include other devices such as Universal Serial Bus (USB) based music playback devices (e.g., Zune™ and iPod® by Apple®). In yet another example, the OCD 54 may include a link that is hardwired coupled into a line-in input provided on the APIM 50. Such a link may receive an input from music playback device to transmit audio via speakers in the vehicle.

In general, the APIM 50 may receive any mobile communication device or digital media player and allow the vehicle occupant to operate such devices via voice input and/or touch input. Switches may be positioned on the APIM 50, the vehicle's steering wheel (not shown), an audio control module (ACM) (not shown), or on the device 22 to enable touch input. In the event the OCD 54 comprises a wireless protocol based text messaging device that is coupled to the APIM 50, the vehicle occupant may be presented with a listing of pre-selected text messages from the APIM 50 for the occupant to select via touch input and/or voice input to transmit the selected text to another user.

A global positioning satellite (GPS) system 56 that includes a receiver (not shown) is operably coupled to the APIM 50 via the data communication bus. The GPS system 56 is configured to provide a signal LOCATION to the APIM 50. The signal LOCATION corresponds to coordinate data that is used to identify the location of the vehicle. The data on the signal LOCATION may comprise latitude and longitudinal information corresponding to the various locations of the vehicle while driven by the primary driver or the secondary driver. In general, a plurality of satellites 62 and/or a plurality of ground stations 64 communicate with the GPS system 56 to establish the location of the vehicle. For example, the GPS system 56 is capable of establishing the vehicle's position and velocity relative to the earth's surface processing data received from the plurality of satellites 62 and/or the ground stations 64.

As the vehicle moves latitudinally and/or longitudinally across the earth's surface, the GPS system 56 is capable of presenting the position of the vehicle with reference coordinates that correspond to, among other things, the latitude and longitude on the earth's surface. It is generally known that the implementation of a GPS system 56 on a vehicle is capable of providing the position of the vehicle via latitude and longitude coordinates relative to the earth's surface.

The primary driver may enable the operation of recording the locations visited by the secondary driver. For example, the primary driver may enable the tracking feature via one or more of the user interfaces positioned on the device 22 (e.g., display 24, switches 26, and voice command 27). The device 22 transmits a signal CONTROL to the APIM 50 to trigger the APIM 50 to initiate the vehicle tracking feature. The device 22 prevents the secondary driver from disabling the operation of recording the locations once the tracking feature is set by the primary driver. The APIM 50 receives the signal LOCATION and stores the latitude, longitude, and time data included thereon in response receiving the signal CONTROL and the signal DRIVER_STATUS_1 indicating that the driver of the vehicle is the secondary driver. The APIM 50 stores the locations and corresponding time in which each location was visited (e.g., date and time).

A memory map device 60 having topographical maps stored therein may be received by the APIM 50 so that a pictorial map of the locations visited by the secondary driver and corresponding times such locations were visited can be visually presented in a format that is understood by the primary driver. In one example, the memory map device 60 may be a secure data (SD) card. Such SD cards are known to include pictorial map data that can be rendered for presentation to a user. The APIM 50 may merge the stored latitude and longitude data with the pictorial map data provided by the memory map device 60 so that a visual display can be presented along with addresses and or other markings to identify the locations visited by the driver. Irrespective of whether the memory map device 60 is operably coupled to the APIM 50, the APIM 50 will continue to store the location information provided by the GPS system 56. It is generally contemplated that the APIM 50 stores the location information for a predetermined amount of time. In one example, the APIM 50 may record data for seven days and write over the data that is older than the seven day period. The time period used for recording data may vary. The APIM 50 may receive time data from the GPS system 56 or from the OCD 54 that is operably coupled therewith.

Conventional systems may not be configured to record the location data if the memory map device 60 is not present. It is contemplated that the secondary driver may attempt to remove the memory map device 60 from the APIM 50 as a mechanism to disable the tracking feature. To bypass this condition, the APIM 50 is configured to continuously store the location data irrespective of the presence of the memory map device 60. The APIM 50 is capable of visually presenting such data when the memory map device 60 is operably coupled to the APIM 50.

In general, the APIM 50 may present the pictoral maps of locations visited and corresponding date/time to the device 22 over a signal DISPLAY. The display 24 may assign unique colors to the recorded locations based on driver status (e.g. whether the driver is the primary driver or the secondary driver). The device 22 prevents the secondary driver from erasing the trail of recorded locations accrued by the secondary driver. The primary driver can enter an expiration time via the user interfaces 24, 26, 27 so that the trails of recorded data are automatically removed for presentation upon the expiration time being achieved.

In yet another example, the APIM 50 may download the map and corresponding recorded locations to a portable memory device 62. The APIM 50 may include a port 61 for receiving the portable memory device 62. In yet another example, the APIM 50 may wirelessly transmit map data with the corresponding recorded locations to a server (not shown) over a link 63 so that the primary driver can review the same over a computer. Methods that can be used to wirelessly transmit data from the vehicle with the link 53 may include, but not limited to, voice over data (such as but not limited to, services provided by Airbiquity®), data channels provided on OCD 54, or Wifi. In yet another example, the APIM 50 may transmit the visited locations to the device 22 so that the device 22 can audibly transmit the locations visited by the secondary driver via the voice output 29.

FIG. 2 depicts another system 70 for differentiating between primary and secondary drivers of a vehicle and for tracking the location of the vehicle based on the status of the driver in accordance to one embodiment of the present invention. The system 70 implements a passive entry passive start function to gain entry into and to start the vehicle as opposed to the PATS system that is used for the system 20 for starting the vehicle. A passive entry passive start (PEPS) controller 82 may be operably coupled to the device 22. While FIG. 2 generally illustrates that the PEPS controller 82 is positioned external to the device 22, additional implementations may include positioning the PEPS controller 82 within the device 22. The particular placement of the PEPS controller 82 with respect to the device 22 may vary based on the desired criteria of a particular implementation.

In general, the PEPS function is a keyless access and start system. The driver may carry one or more keys 35' that may be in the form of an electronic transmission device. The keys 35' each include the ignition key device 36 embedded within for communicating with the PEPS controller 82. The transponder of the ignition key device 36 is adapted to send the electronic code as the signal DRIVER_STATUS to the PEPS controller 82. To gain access or entry into the vehicle with the keys 35' in the PEPS implementation, the driver may need to wake up the PEPS controller 82 to establish bi-directional communication between the keys 35' and the PEPS controller 82. In one example, such a wake up may occur by requiring the driver to touch and/or pull the door handle (not shown) of the vehicle.

In response to the door handle being toggled or touched, the PEPS controller 82 may wake up and transmit RF based signals to the keys 35'. The PEPS controller 82 and the keys 35' may undergo a series of communications back and forth with each other (e.g., handshaking) for vehicle access authentication purposes. The PEPS controller 82 may unlock the doors in response to a successful completion of the handshaking process. Once the driver is in the vehicle, the driver may simply press a button (not shown) positioned on an instrument panel to start the vehicle.

In one example, the system 70 may be adapted to tag or associate the keys as either a primary or a secondary key during a learn operation as discussed with the PATS controller 30. In yet another example, the system 70 may be configured to associate the keys 35' as primary or secondary keys in the manner identified and disclosed in one or more of the following U.S. patent Ser. Nos. 12/139,005, entitled "SYSTEM AND METHOD FOR PROGRAMMING KEYS TO VEHICLE TO ESTABLISH PRIMARY AND SECONDARY DRIVERS" and filed on Jun. 13, 2008; 12/433,642, entitled "SYSTEM AND METHOD FOR ASSIGNING DRIVER STATUS TO A SPARE KEY AND FOR PROGRAMMING THE SPARE KEY TO A VEHICLE" and filed on Apr. 30, 2009; and Ser. No. 12/992,397 entitled "SYSTEM AND METHOD FOR CONTROLLING AN ENTERTAINMENT DEVICE IN A VEHICLE BASED ON DRIVER STATUS AND A PREDETERMINED VEHICLE EVENT" and filed on Nov. 12, 2010. The PEPS controller 82 may determine the driver status based on the information indicated on the signal DRIVER_STATUS as noted in connection with the system 20 of FIG. 1.

The PEPS controller 82 is adapted to provide the signal DRIVER_STATUS_1 to the various controllers over the communication bus. The signal DRIVER_STATUS_1 corresponds to whether the driver is the primary driver or the secondary driver. The PEPS controller 82 may also transmit the signal IGN_SW_STS to the device 22. The PEPS controller 82 determines that the key ignition status is in the run position in response to the driver toggling the brake pedal (not shown) and depressing the start switch. In such a case, the vehicle is started and the PEPS controller 82 transmits the signal IGN_SW_STS as being in the run state. In the event the driver selects only the start button, the PEPS controller 82 transmits the signal IGN_SW_STS as being in the accessory state.

While FIGS. 1-2 generally disclose keys 35 and 35' that are used in connection with the PATS and PEPS implementations, respectively, it is generally contemplated that the keys may be implemented as a cell phone or other suitable switch device used to authenticate the driver to the vehicle for enabling entry into the vehicle or for starting the vehicle. Data transmitted from the cell phone may be received by a receiver (not shown) on the vehicle and decoded to perform driver authentication for gaining entry into the vehicle, starting the vehicle, and ascertaining driver status.

The system 70 operates in a similar manner to the system 20 with respect to recording the locations visited by the secondary driver. As noted above, the APIM 50 is configured to receive and store the location data and corresponding date/time on the signal LOCATION irrespective of the presence of the memory map device 60 (e.g. if the vehicle tracking feature is enabled). The system 70 includes similar capabilities as to the manner in which the location data is presented to the primary driver as those noted in connection with the system 20.

FIG. 3 depicts a method 200 for tracking the location of the vehicle based on the status of the driver in accordance to one embodiment of the present invention.

In operation 202, the APIM 50 receives the signal DRIVER_STATUS_1 from either the PATS controller 30 or the PEPS controller 82.

In operation 204, the APIM 50 determines whether the driver of the vehicle is the primary driver or the secondary driver based on the data contained on the signal DRIVER_STATUS_1. If the device 22 detects that the driver is the primary driver, then the method 200 moves to operation 206. If the device 22 detects that the driver is the secondary driver, then the method 200 moves to operation 208.

In operation 206, the APIM 50 module determines whether the vehicle tracking feature is enabled. For example, the APIM 50 receives the signal CONTROL to determine whether the primary driver has enabled the vehicle tracking feature. If the vehicle tracking feature is enabled, the method 200 moves to operation 209. The primary driver may enable the tracking feature so that the primary driver can use the recorded location information in the event the he/she gets lost. The primary driver can use the recorded information as a means of recalling where a particular location is in the event the driver intends to travel to this location in the future. Particularly, if the recorded location is a new location not visited or rarely visited by the primary driver. If the vehicle tracking feature is disabled, the method 200 moves to the stop state.

In operation 209, the APIM 50 receives and stores the location data provided on the signal LOCATION at all times irrespective of whether the memory map device 60 is operably coupled to the APIM 50. For example, the GPS system 56 provides all of the coordinates that correspond to locations visited by the primary driver to the APIM 50.

In operation 210, the APIM 50 determines whether the memory map device 60 is operably coupled therewith so that the location data can be overlaid on top of the map data provided by the memory map device 60. If the memory map device 60 is not available, the method 200 remains in state 210. If the memory map device 60 is available, the method 200 moves to operation 212.

In operation 212, the APIM 50 overlays the GPS coordinates received on the signal LOCATION on the map data provided by the memory map device 60 for presentation to the primary driver via one or more of the options discussed above in connection with FIGS. 1-2. The data presented in operation 212 is indicative of the locations visited by the primary driver.

In operation 208, the APIM 50 determines whether the signal CONTROL indicates that the vehicle tracking feature is enabled. For example, the primary driver may have enabled this feature so that the APIM 50 tracks the locations visited by the secondary driver. The secondary driver is not capable of de-activating this feature if set by the primary driver. If the vehicle tracking feature is disabled for the secondary driver by the primary driver, then the method 200 moves to operation 213. If the vehicle tracking feature is enabled for the secondary driver by the primary driver, then the method 200 moves to operation 214.

In operation 213, the communication module 50 is capable of receiving the signal CONTROL from the device 22 to activate the tracking feature for the secondary driver. In other words, the secondary driver is capable of enabling the tracking feature for himself/herself via the device 22. The secondary driver may want to enable the feature in the event he/she is lost or has to recall a location that was visited and has no recollection of where that particular location was located. In one example, the data presented on the display 22 may include a unique color to identify the recorded locations for the secondary driver. In yet another example, the device 22 may not display the recorded locations for display to the primary driver (or wireless transmission/downloading to portable memory device to primary driver). Such a condition may provide some degree of privacy for the secondary driver.

In operation 214, the APIM 50 receives and stores the location data provided on the signal LOCATION at all times irrespective of whether the memory map device 60 is operably coupled to the APIM 50. For example, the GPS system 56 provides all of the coordinates that correspond to locations visited by the secondary driver to the APIM 50.

In operation 216, the APIM 50 determines whether the memory map device 60 is operably coupled therewith so that the location data can be overlaid on top of the map data provided by the memory map device 60. If the memory map card 60 is not available, the method 200 moves back to operation 214. If the memory map device 60 is available, the method 200 moves to operation 212.

In operation 212, the APIM 50 overlays the GPS coordinates received on the signal LOCATION on the map data provided by the memory map card 60 for presentation to the primary driver via one or more of the options discussed above in connection with FIGS. 1-2. The data presented in operation 212 is indicative of the locations visited by the secondary driver.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An apparatus for tracking locations visited by one of a primary driver and a secondary driver in a vehicle, the apparatus comprising:
   a communication module operably coupled to a global positioning satellite (GPS) system and being configured to:
      receive a driver status signal indicative of the driver being the one of the primary driver and the secondary driver;
      determine that the driver status signal corresponds to the secondary driver;
      detect the presence of a removable memory map device in the vehicle, the removable memory map device for providing map data for one or more locations that are capable of being visited by the secondary driver;
      receive a location signal having coordinate data from the GPS system to track the one or more locations visited by the secondary driver; and
      store the coordinate data of the location signal when the removable memory map device is removed so that an operation of tracking the one or more locations visited by the secondary driver cannot be disabled.

2. The apparatus of claim 1 wherein the communication module is further configured to overlay the coordinate data on the map data to transmit the one or more locations visited by the secondary driver in a format that is suitable for presentation to the primary driver.

3. The apparatus of claim 2 wherein the communication module is further configured to wirelessly transmit a signal having the coordinate data and the map data to a server for retrieval by the primary driver.

4. The apparatus of claim 2 wherein the communication module is further configured to transmit the coordinate data and the map data to a portable memory device.

5. The apparatus of claim 2 wherein the communication module is further configured to transmit the coordinate data and the map data to a display for visual presentation to the primary driver.

6. The apparatus of claim 1 wherein the communication module is further configured to receive a control signal to activate the operation of storing the coordinate data.

7. The apparatus of claim 6 further comprising a vehicle interface device configured to generate the control signal, the vehicle interface device including at least one user interface for enabling the primary driver to control the vehicle interface device to transmit the control signal when the secondary driver is detected to be the driver of the vehicle.

8. A method for tracking locations visited by one of a primary driver and a secondary driver in a vehicle, the method comprising:
   receiving a driver status signal indicative of the driver being the one of the primary driver and the secondary driver;
   determining that the driver status signal corresponds to the secondary driver;
   detecting the presence of a removable memory map device in the vehicle, the removable memory map device for providing map data for one or more locations that are capable of being visited by the secondary driver;
   receiving a location signal having coordinate data from a global positioning satellite (GPS) system;
   tracking the one or more locations visited by the secondary driver; and
   storing the coordinate data of the location signal when the removable memory map device is not detected for the secondary driver such that tracking the one or more locations visited by the secondary driver cannot be disabled.

9. The method of claim 8 further comprising overlaying the coordinate data on the map data to transmit the one or more locations visited by the secondary driver in a format that is suitable for presentation to the primary driver.

10. The method of claim 9 further comprising wirelessly transmitting a signal having the coordinate data and the map data to a server for retrieval by the primary driver.

11. The method of claim 9 further comprising transmitting the coordinate data and the map data to a portable memory device.

12. The method of claim 9 further comprising transmitting the coordinate data and the map data to a display for visual presentation to the primary driver.

* * * * *